UNITED STATES PATENT OFFICE.

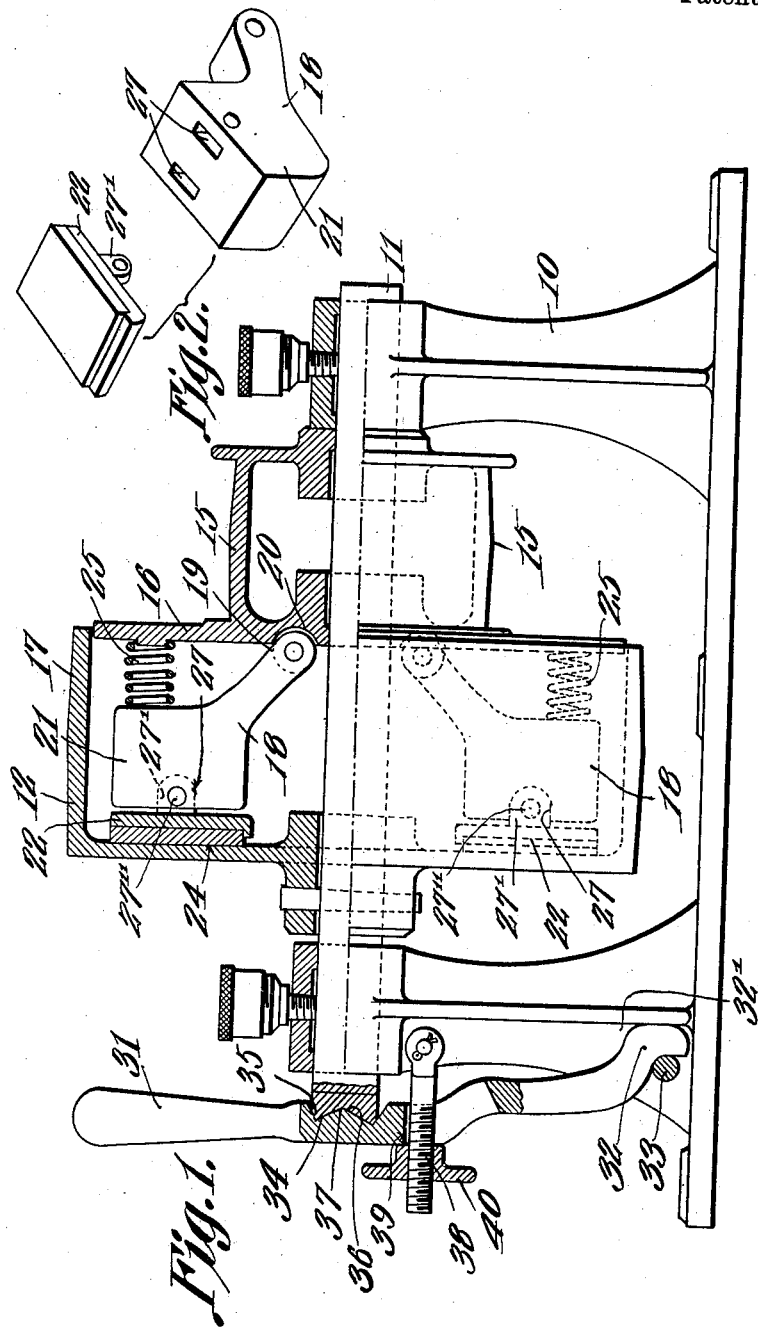

FRED E. PARKER, OF LANSING, MICHIGAN.

SPEED-GOVERNING PULLEY.

1,078,161.  Specification of Letters Patent.  Patented Nov. 11, 1913.

Application filed May 31, 1912. Serial No. 700,724.

*To all whom it may concern:*

Be it known that I, FRED E. PARKER, a citizen of the United States, residing at Lansing, in the county of Ingham and State of Michigan, have invented new and useful Speed-Governing Pulleys, of which the following is a specification.

This invention relates to an improvement in speed governing pulleys.

The primary object of the present invention is to provide a speed regulator adapted for use where a constant speed of rotation is desired from a variable source, the mechanism being such that the driven element will be maintained at a fixed speed regardless of the change in speed of the driving element.

With the foregoing and other objects in view which will appear as the description proceeds. the invention resides in the combination and arrangement of parts and in the details of construction hereinafter described and claimed, it being understood that changes in the precise embodiment of the invention herein disclosed can be made within the scope of what is claimed without departing from the spirit of this invention.

In the accompanying drawings, forming a part of this specification: Figure 1 is an elevation partly in section. Fig. 2 a detail view of one of the resiliently supported shoes which transmit the power from the driving element to the driven element.

In the drawings, 10 designates a support for the driven shaft 11, the pulley 12 being fixed on said shaft. The pulley 12 is substantially cup-shaped and is disposed adjacent the driven pulley 15 which is loosely mounted on the shaft 11. The driven pulley 15 is provided with the annular extensions 16 of a diameter slightly less than the diameter of the housing 17 of the pulley 12, the same being disposed within said housing. A plurality of weighted members 18 are pivotally supported by the lugs 19 which are secured to the base 20 of the loose pulley. These members 18 are provided with enlarged portions 21 and pivotally supported by said enlarged portions are the shoes 22 which frictionally engage the surface 24 of the pulley 12, transmitting the movement of said pulley 12 to the pulley 15 through the members 18. The members 18 support the shoes 22 in yielding contact with the plates 24 of the pulley 12, a coil spring 25 being interposed between the annular member 16 and the members 18, the members 18 being formed with recesses 27 which receive the lugs 27' of the shoes 22, a pin 27" passing through said members, said pin extending through the apertures in the lugs, the shoes thus being pivotally supported by the members 18.

It will be noted that should the speed of the pulley 12 increase beyond the normal that the members 18 will compress the spring 25, the shoes 22 which are pivotally secured to the members 18 by the apertured ears 27' will be brought out of contact with the surface 24 of the pulley 12. Thus it will be noted that the increased speed imparted to the pulley 12 will not be transmitted to the pulley 15 and in this manner the pulley 15 may be regulated, it being impossible to drive said pulley beyond a certain speed regardless of the speed at which the pulley 12 travels.

The advantages of a construction of this character will be clearly apparent and it will be noted that the same is easily and economically manufactured and that the various parts may be readily assembled.

The driven member is maintained in contact with the shoes by the lever 31, said lever being formed with the curved terminal 32 which is pivotally supported between the portion 32' of the standard 10 and the pin 33. This lever is formed with the depression 34 which receives the terminal 35 of the shaft 11, said shaft being formed with the depression 36 which receives the extension 37 of the lever. A screw 38 is pivotally supported by the standard 10 said screw passing through the aperture 39 in the lever, a nut 40 being threaded on said screw said nut contacting with the lever to hold the same in contact with the shaft.

Having thus described the invention what is claimed as new is:—

1. A speed governor comprising a shaft, suitable supports for said shaft, a pulley fixedly mounted on said shaft and provided with an annular housing, a pulley loosely mounted on said shaft and provided with an annular extension, said loose pulley being held from shifting longitudinally of said shaft by contacting with said shaft support, weighted members pivotally supported by said extension, said members being resiliently spaced from said extension and adapted to contact with said annular housing, said members being adapted to be acted on by centrifugal force in opposition to said resilient spacing means, a lever adapted to shift said shaft to thereby increase the effect of said resilient spacing means, and means for holding said shifting lever in any desired position.

2. A speed governor comprising a shaft, a pulley fixedly mounted on said shaft and formed with an annular housing, a pulley loosely mounted on said shaft and formed with an annular flange extension, said extension adapted to fit within said annular housing, suitable supports for said shaft, said loose pulley being held from shifting longitudinally of said shaft by contacting with said shaft supports, weighted members pivotally supported by said extension, said members being resiliently spaced from said extension and adapted to contact with the vertical flanged face of said fixed pulley adjacent the outer portion thereof, a friction shoe pivotally secured to said weighted members, said shoe mounted eccentric of said vertical flange of said fixed pulley and adapted to frictionally engage the outer portion thereof, a lever pivotally secured to one of said shaft supports and adapted to contact with said shaft to shift the latter to thereby increase the effect of said resilient spacing means, and means for holding said shifting lever in any desired position.

In testimony that I claim the foregoing as my own, I have hereto affixed my signature in the presence of two witnesses.

FRED E. PARKER.

Witnesses:
O. D. HARDY,
DAN HELLER.

---

Copies of this patent may be obtained for five cents each, by addressing the "Commissioner of Patents, Washington, D. C."